Sept. 27, 1949.　　　　　J. H. HOLSTEIN　　　　2,482,911
APPARATUS FOR LINKING SAUSAGE
Filed Dec. 21, 1946　　　　　　　　　　　　2 Sheets-Sheet 1
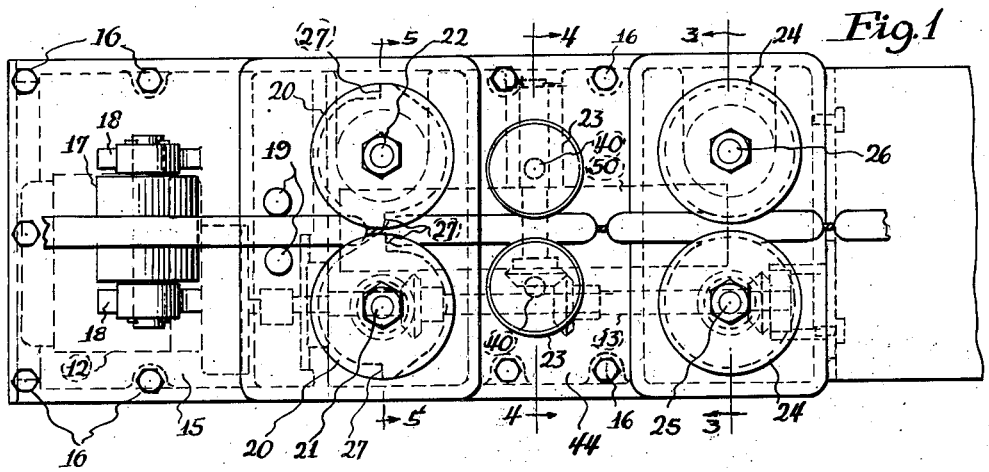
INVENTOR
John H. Holstein
Charles M. Lindrooth
ATTORNEY

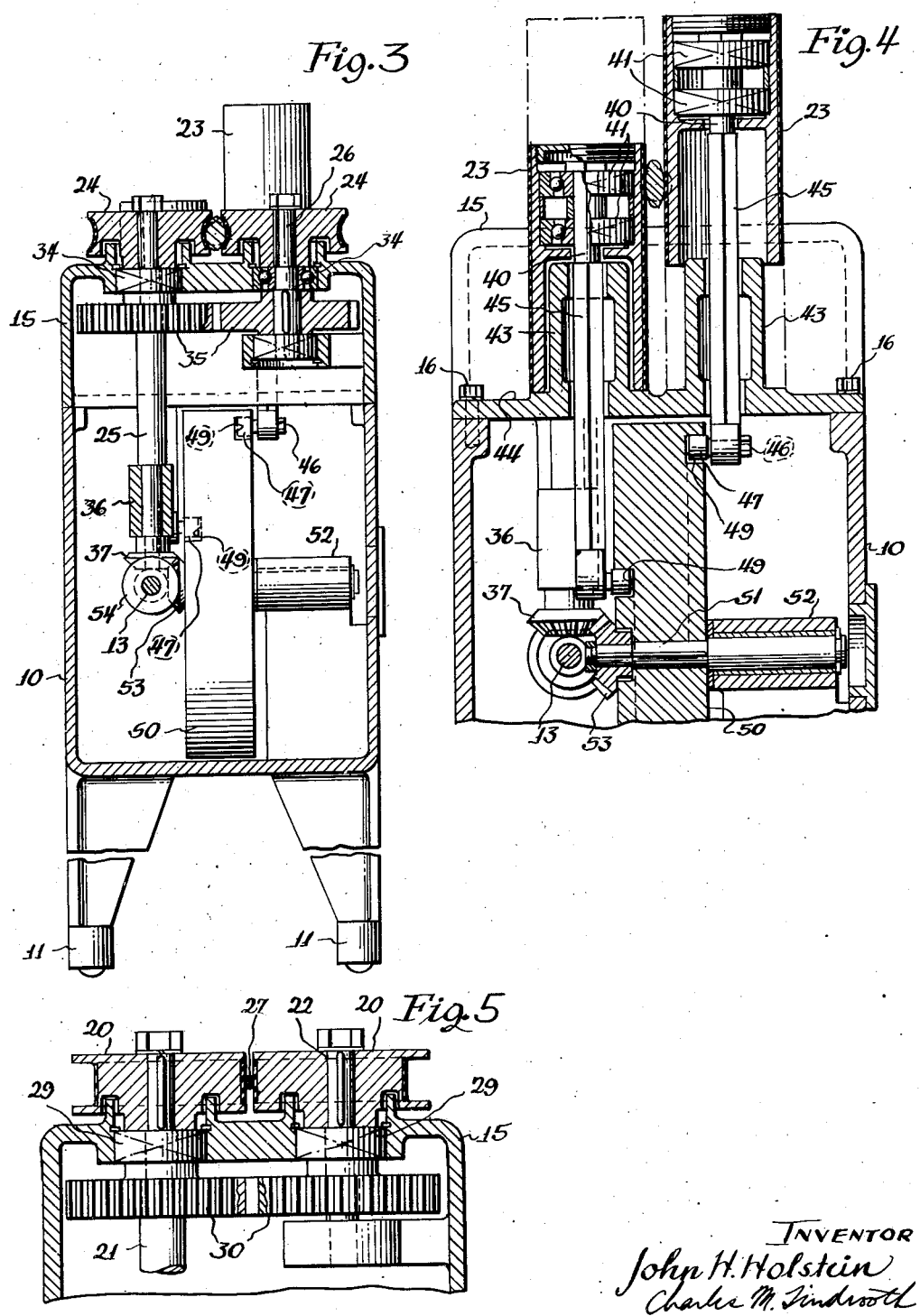

Patented Sept. 27, 1949

2,482,911

UNITED STATES PATENT OFFICE 2,482,911

APPARATUS FOR LINKING SAUSAGE

John H. Holstein, Chicago, Ill.

Application December 21, 1946, Serial No. 717,684

8 Claims. (Cl. 17—34)

1

This invention relates to improvements in apparatus for linking sausage.

The principal object of my invention is to provide a new and novel device of a simple and efficient construction for segregating bulk sausage into even links and for twisting the segregated links in a continuous operation.

A more specific object of my invention is to provide a new and novel device for linking sausage which includes two rollers oppositely and reciprocably movable in the direction of their axes and engaging opposite sides of the sausage and freely rotatable in the direction of travel of the sausage through the apparatus so as to efficiently twist the ends of the segregated links of the sausage without tearing the sausage casing or hindering travel of the sausage through the apparatus.

These and other objects of my invention will appear from time to time as the following specification proceeds and with reference to the accompanying drawings wherein:

Figure 1 is a plan view of a sausage linking device constructed in accordance with my invention;

Figure 2 is a view in side elevation of the device shown in Figure 1, with certain parts thereof shown in substantially longitudinal section;

Figure 3 is an enlarged transverse sectional view taken substantially along line 3—3 of Figure 1;

Figure 4 is an enlarged fragmentary transverse sectional view taken substantially along line 4—4 of Figure 1; and Figure 5 is an enlarged fragmentary transverse sectional view taken substantially along line 5—5 of Figure 1.

In the drawings, the machine in general comprises a main frame which may be in the form of a casting including a base frame 10 adapted to rest on the floor or on a table on legs 11, 11. Said base frame or casting forms a mounting for a motor 12, and has a longitudinal shaft 13 journaled therein and driven from said motor through a speed reducer generally indicated by reference character 14, for driving the parts of the linking apparatus as will hereinafter more clearly appear. Said main frame also includes a working platform 15 mounted on the top of said base and secured thereto as by cap screws 16, 16.

The sausage segregating and twisting mechanism may be mounted on the top of said platform and as herein shown includes a roller 17 mounted at the entering end of said platform on a pair of laterally spaced upstanding brackets 18, 18 and arranged so as to support the bulk sausage in its

2 casing as it enters the machine in its plane of travel through the machine. From said roller the bulk sausage passes through two laterally spaced vertical guide rollers 19, 19 and between a pair of laterally spaced segregating rollers 20, 20. Said rollers are so spaced that their outer peripheries are closely adjacent each other and are mounted on and are rotatably driven from the upper ends of laterally spaced vertical shafts 21 and 22. Said segregating rollers are adapted to push the sausage through the machine and segregate the bulk sausage in its casing into evenly spaced links, and to hold the bulk sausage from turning movement as it enters said rollers and also during twisting of the segregated link of the sausage which has passed beyond said segregating rollers as will hereinafter more clearly appear as this specification proceeds.

From the segregating rollers 20, 20 the sausage passes between two parallel spaced twisting rollers 23, 23, herein shown as being reciprocably movable vertically in directions opposite from each other and as being freely rotatable in the direction of travel of the sausage through the apparatus, to permit uninterrupted travel of the sausage through the apparatus during the twisting operation thereof. From thence the sausage passes between two parallel spaced power driven conveying and holding rollers 24, 24 mounted on and driven from the upper ends of upright vertical shafts 25 and 26, and adapted to hold the linked sausage from turning during the twisting operation of the segregated links of the sausage as they successively pass in the space between said segregating and conveying rollers, and to pull the sausage through the machine.

The segregating rollers 20, 20 are grooved for a substantial portion of the circumference thereof to receive the bulk sausage therebetween. The grooved portions of said rollers gradually extend outwardly towards the periphery thereof at opposite sides of each of said rollers, to form two segregating dogs 27, 27, herein shown as being spaced 180° apart. Said rollers are so timed that said dogs will register with each other for each half revolution of said rollers to squeeze the sausage together at regular intervals and segregate the bulk sausage into evenly spaced links of the desired length, the length of which may be varied by varying the diameters of said rollers. The grooved portions of said rollers may be lined with a resilient material such as rubber, cork, or any other suitable material which will grip and hold and propel the sausage without slipping or tearing its casing.

The vertical shafts 21, 22 are journaled in the top of the platform 15 on anti-friction bearings 29, 29, and are connected to operate together by means of a pair of meshing spur gears 30, 30 keyed on said shafts. The shaft 21 extends downwardly beneath its spur gear 30 and is journaled adjacent its lower end in a bracket 31 depending from the platform 15, within the base frame 10. A bevel gear 32 is keyed on the lower end of said shaft and meshes with and is driven from a bevel gear 33 keyed on the longitudinal shaft 13.

The holding and conveying rollers 24, 24 are concavely grooved in substantially the form of the sausage in cross section and may be lined with a resilient material, such as rubber, cork, or any other suitable material which will grip and hold and convey the sausage without slipping or tearing its casing. The vertical shafts 25, 26 on which said rollers are mounted are journaled in the top of the platform 15 on anti-friction bearings 34, 34, and are connected to operate together by means of a pair of meshing spur gears 35, 35 keyed on said shafts. The shaft 25 depends from its spur gear 35 and is journaled adjacent its lower end in a bracket 36 depending from the platform 15, and has a bevel gear 37 keyed on its lower end which meshes with and is driven from a bevel gear 39 keyed on the longitudinal shaft 13, adjacent its forward end.

The twisting rollers 23, 23 are mounted adjacent their upper ends on the upper ends of rectilinearly movable vertical shafts 40, 40 on anti-friction bearings 41, 41, which permit said rollers to freely rotate in the direction of travel of the sausage through the apparatus during reciprocable movement thereof (see Figure 3). The lower portions of said rollers extend around and are vertically guided by upright cylindrical guides 43, 43, herein shown as being formed integrally with an intermediate depressed portion 44 of the working platform 15, and as projecting upwardly from the top thereof. Said guides have apertures formed in the top and bottom surfaces thereof which are herein shown as being rectangular and as being adapted to receive and form slidable guides for similar rectangular portions 45, 45 of the shafts 40, 40, which extend therethrough downwardly into the base casting 10. A pin 46 is mounted on the lower end of each of said shafts and extends inwardly therefrom. Each of said pins has a roller 47 journaled thereon and adapted to extend within a groove or cam 49. Said cams are formed in the outer faces of a rotatable cam disk 50. Said disk is keyed on a transverse shaft 51 journaled at one of its ends in a bearing support 52, herein shown as being formed integrally with the base casting 10. A bevel pinion 53 is keyed on the end of said shaft opposite from said bearing and meshes with and is driven from a bevel gear 54 keyed on the longitudinal shaft 13 intermediate the bevel gears 33 and 39 (see Figure 2).

The cams 49, 49 on opposite faces of the cam disk 50 are disposed 180° apart to reciprocably move the twisting rollers 23, 23 in opposite directions, for twisting the segregated links of the sausage as the portions of the sausage on opposite sides of said twisting rollers are held from twisting movement by the rollers 20, 20 and 24, 24. As herein shown, said cams are formed in a predetermined pattern with a dwell at each end of the strokes of each of said rollers, to permit the twisted portion of the sausage to pass by said rollers while said rollers are free from reciprocating movement.

As the sausage passes through the apparatus the twisting operation of one link of the sausage between the segregating and conveying and holding rollers 20, 20 and 24, 24, is started adjacent the advance end of said link by movement of said twisting rollers rectilinearly in opposite directions while the unsegregated sausage is held from twisting movement by the segregating rollers 20, 20, and the advance twisted link of the sausage is held from twisting movement by the conveying rollers 24, 24. As said twisting rollers have completed their strokes in one direction the dwells in the cams 49, 49 will permit the twisted portion of the segregated link to pass thereby while said rollers are free from reciprocating movement. Said rollers will then engage opposite sides of the adjacent end of the next adjacent link of the sausage, and will reverse their directions of travel to twist the next adjacent link oppositely from the advance link.

It should here be noted that since the twisting rollers 23, 23 alternately reverse their directions of travel to first twist one link of the sausage in one direction and then twist the next succeeding link of the sausage in an opposite direction, the link which has just been twisted will not be untwisted by the second twisting operation but twisting of the retreating end of the advance link of the sausage will be doubled when twisting the next succeeding link. The ends of each sausage are thus twisted for half the required amount when passing between the rollers 20 and 24 and the twisting of the following end of the advance sausage is doubled when it has been engaged by and held from rotation by the rollers 24, 24 and is pulled to the discharge end of said apparatus by said rollers.

It may be seen from the foregoing that the device just described is of a simple and efficient construction and is continuously operable to segregate the bulk sausage into even links and to twist the segregated links in a simplified manner without tearing the casing of the sausage or hindering travel of the sausage through the apparatus. It may further be seen that this is attained by providing rollers to twist the sausage and by mounting the twisting rollers so they rotate freely in the direction of travel of the sausage through the apparatus during the twisting operation; by reciprocably moving said twisting rollers in opposite directions transversely to the path of travel of the sausage through the apparatus while engaging the segregated links of the sausage; by reversing the travel of said twisting rollers when engaging the next succeeding link so as to twist alternate segregated links of the sausage in opposite directions, to prevent the untwisting of one end of the sausage while twisting its opposite end; and by so moving said twisting rollers that they are free from reciprocable movement while one link of the sausage leaves said twisting rollers and the next succeeding link comes into engagement with said twisting rollers.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In an apparatus for linking sausage, a main frame, two spaced segregating rollers mounted on said main frame adjacent the advance end of the apparatus, power means for driving said rollers, said rollers having spaced registering segregating lugs engageable with opposite sides of the casing of the bulk sausage at regular intervals to segregate the bulk sausage into even links, two spaced rollers mounted on said main frame at the discharge end of the apparatus, power means for driving said rollers, said rollers being adapted to engage opposite sides of the linked sausage and hold the linked sausage from twisting movement and pull it through the apparatus, and two spaced rectilinearly movable twisting rollers disposed between said segregating and said holding rollers for engagement with opposite sides of the sausage, reciprocating drive mechanism operatively connected to said rollers to oppositely move said rollers in the directions of their axes, and twist the segregated links of the sausage, while the sausage on opposite sides of said twisting rollers is held from twisting movement, said twisting rollers being freely rotatable in the directions of travel of the sausage through the apparatus, to permit uninterrupted travel of the sausage through the apparatus during the twisting operation thereof.

2. In an apparatus for linking sausage, a main frame, two spaced segregating rollers mounted on said main frame adjacent the advance end of the apparatus and having spaced registering segregating lugs engageable with opposite sides of the casing of the bulk sausage at regular intervals to segregate the bulk sausage into even links and push the sausage through the apparatus and hold the unsegregated bulk sausage from twisting movement, two spaced rollers at the discharge end of the apparatus adapted to engage opposite sides of the linked sausage and hold the linked sausage from twisting movement as it leaves the apparatus and pull it through the apparatus, power means for rotatably driving said segregating and said holding rollers at the same peripheral speeds, two spaced rectilinearly movable twisting rollers disposed between said segregating and said holding rollers and adapted to engage opposite sides of the segregated links of the sausage as they pass thereby, said rollers being freely rotatable in the direction of travel of the sausage through the apparatus, to permit uninterrupted travel of the sausage through the apparatus during the twisting operation thereof, and reciprocating drive mechanism operatively connected to said twisting rollers to reciprocably and oppositely move said twisting rollers in the directions of their axes to twist the segregated links of the sausage, while the sausage on opposite sides of said twisting rollers is held from twisting movement, said reciprocating drive mechanism being so constructed and arranged as to cause a predetermined dwell in the movement of said rollers at the ends of their strokes while the twisted end portions of the segregated links of the sausage pass by said twisting rollers and until the advance end of the next adjacent link of the sausage is engaged by said twisting rollers.

3. In an apparatus for linking sausage, a main frame, two spaced segregating rollers mounted on said main frame adjacent the advance end of the apparatus and having spaced registering segregating lugs adapted to engage the casing of the sausage at regular intervals and segregate the bulk sausage into even links, said rollers also being adapted to push the sausage through the apparatus and to hold the unsegregated bulk sausage from twisting movement, two spaced rollers at the discharge end of the apparatus adapted to hold the linked sausage from twisting movement as it leaves the apparatus and to pull it through the apparatus, power means for rotatably driving said segregating and said holding rollers at the same peripheral speeds, two spaced rectilinearly movable twisting rollers disposed between said segregating and said holding rollers and adapted to have engagement with opposite sides of the segregated links of the sausage as they pass thereby, said rollers being freely rotatable in the direction of travel of the sausage through the apparatus, to permit uninterrupted travel of the sausage through the apparatus during the twisting operation thereof, and two power driven oppositely disposed cams rotatable together and having operative connection with said rollers for reciprocably and oppositely moving said twisting rollers in the directions of their axes for twisting the segregated links of the sausage while the sausage on opposite sides of said twisting rollers is held from twisting movement.

4. In an apparatus for linking sausage, a main frame, two spaced segregating rollers mounted on said main frame adjacent the advance end of the apparatus and having spaced registering segregating lugs adapted to engage the casing of the sausage at regular intervals and segregate the bulk sausage into even links, said rollers also being adapted to push the sausage through the apparatus and to hold the unsegregated bulk sausage from twisting movement, two spaced rollers at the discharge end of the apparatus adapted to hold the linked sausage from twisting movement as it leaves the apparatus and pull it through the apparatus, power means for rotatably driving said segregating and said holding rollers at the same peripheral speeds, two spaced rectilinearly movable twisting rollers disposed between said segregating and said holding rollers and engageable with opposite sides of the segregated links of the sausage as they pass thereby, said rollers being freely rotatable in the direction of travel of the sausage through the apparatus, to permit uninterrupted travel of the sausage through the apparatus during the twisting operation thereof, and two power driven cams rotatable together and operatively connected with said rollers for reciprocably and oppositely moving said twisting rollers in the directions of their axes and twist the segregated links of the sausage while the sausage on opposite sides of said twisting rollers is held from twisting movement, said cams being of a similar construction but being 180° out of phase with respect to each other and having dwells at opposite ends thereof to cause a hesitancy in the reciprocating movement of said rollers at the ends of their strokes while the twisted portions of the segregated links of the sausage pass by said twisting rollers and until the advance end of the next adjacent link of the sausage is engaged by said twisting rollers.

5. In an apparatus for linking sausage, a main frame, two spaced segregating rollers mounted on said main frame adjacent one end thereof, power means for driving said rollers in the direction of travel of the sausage through the apparatus, said rollers each having segregating means adapted to engage and segregate the bulk sausage into even links while holding it from rotation and pushing it through the apparatus, two spaced pulling rollers mounted on said main frame in advance of said segregating rollers, power means for driving said rollers in the direction of travel of the sausage through the apparatus, said rollers being adapted to hold the sausage from rotation while pulling it through the apparatus, two spaced twisting rollers mounted on said main frame between said segregating and said pulling rollers for free rotation in the direction of travel of the sausage through the apparatus, reciprocating power driven means, and operative connections between said reciprocating power driven means and said twisting rollers to reciprocably and oppositely drive said twisting rollers in the directions of their axes, and cause said rollers to effect twisting of the ends of the segregated links of sausage while passing therebetween.

6. In an apparatus for linking sausage, a main frame, two spaced segregating rollers mounted on said main frame adjacent one end thereof, power means for driving said rollers in the direction of travel of the sausage through the apparatus, said rollers each having segregating means adapted to engage and segregate the bulk sausage into even links while holding it from rotation and pushing it through the apparatus, two spaced pulling rollers mounted on said main frame in advance of said segregating rollers, power means for driving said rollers in the direction of travel of the sausage through the apparatus, said rollers being adapted to hold the sausage from rotation while pulling it through the apparatus, two spaced twisting rollers disposed between said segregating and said pulling rollers and guided on said main frame for movement in the directions of their axes and also being mounted for free rotation about their axes, reciprocating power driven means for reciprocably and oppositely driving said twisting rollers in the directions of their axes including a rotating member, reciprocating motion producing means driven thereby, and operative connections between said reciprocating motion producing means and said twisting rollers, said twisting rollers being adapted to engage and oppositely twist alternate links of the sausage as they pass thereby.

7. In an apparatus for linking sausage, a main frame, two spaced segregating rollers mounted on said main frame adjacent one end thereof, power means for driving said rollers in the direction of travel of the sausage through the apparatus, said rollers each having segregating means adapted to engage and segregate the bulk sausage into even links while holding it from rotation and pushing it through the apparatus, two spaced pulling rollers mounted on said main frame in advance of said segregating rollers, power means for driving said rollers in the direction of travel of the sausage through the apparatus, said rollers being adapted to hold the sausage from rotation while pulling it through the apparatus, two spaced twisting rollers disposed between said segregating and said pulling rollers and guided on said main frame for movement in the directions of their axes and also being mounted for free rotation about their axes, reciprocating power driven means for reciprocably and oppositely driving said twisting rollers in the directions of their axes including a rotating member, cam means driven thereby, and operative connections between said cam means and said twisting rollers so constructed and arranged as to reciprocably drive said twisting rollers in opposite phase relationship with respect to each other, to effect opposite twisting of alternate links of the segregated links of sausage as they pass thereby.

8. In an apparatus for linking sausage, a main frame, two spaced segregating rollers mounted on said main frame adjacent one end thereof, power means for driving said rollers in the direction of travel of the sausage through the apparatus, said rollers each having segregating means adapted to engage and segregate the bulk sausage into even links while holding it from rotation and pushing it through the apparatus, two spaced pulling rollers mounted on said main frame in advance of said segregating rollers, power means for driving said rollers in the direction of travel of the sausage through the apparatus, said rollers being adapted to hold the sausage from rotation while pulling it through the apparatus, two spaced twisting rollers disposed between said segregating and said pulling rollers and guided on said main frame for movement in the directions of their axes and also being mounted for free rotation about their axes, reciprocating power driven means for reciprocably and oppositely driving said twisting rollers in the directions of their axes including a rotating member, two cams driven thereby, said cams being 180° out of phase with respect to each other, operative connections between said cams and said twisting rollers to reciprocably drive said rollers in opposite phase relationship with respect to each other, and said cams having dwells at opposite ends thereof to cause a hesitancy in the reciprocating movement of said rollers at the ends of their strokes, while the twisted portions of the segregated links of the sausage pass by said twisting rollers and until the advance end of the next adjacent link of the sausage is engaged by said twisting rollers.

JOHN H. HOLSTEIN.

No references cited.